United States Patent [19]
Merchant et al.

[11] Patent Number: 6,081,523
[45] Date of Patent: Jun. 27, 2000

[54] ARRANGEMENT FOR TRANSMITTING PACKET DATA SEGMENTS FROM A MEDIA ACCESS CONTROLLER ACROSS MULTIPLE PHYSICAL LINKS

[75] Inventors: Shashank C. Merchant; Mohan V. Kalkunte, both of Sunnyvale; Gopal Krishna, San Jose, all of Calif.

[73] Assignee: Advanced Micro Devices, Inc., Sunnyvale, Calif.

[21] Appl. No.: 08/985,718

[22] Filed: Dec. 5, 1997

[51] Int. Cl.$^7$ .................................................. H04Q 11/00
[52] U.S. Cl. ............................................ 370/389; 370/465
[58] Field of Search .................................... 370/431, 433, 370/445, 473, 389, 450, 377, 465, 536; 395/280

[56] References Cited

U.S. PATENT DOCUMENTS

| | | | |
|---|---|---|---|
| 5,546,543 | 8/1996 | Yang et al. | 395/250 |
| 5,559,796 | 9/1996 | Edem et al. | 370/60 |
| 5,574,726 | 11/1996 | Chan et al. | 370/85.3 |
| 5,680,400 | 10/1997 | York . | |
| 5,737,108 | 4/1998 | Bunch et al. | 359/152 |
| 5,812,554 | 9/1998 | Kadambi et al. | 370/473 |
| 5,825,755 | 10/1998 | Thompson et al. | 370/296 |
| 5,881,074 | 3/1999 | Rao | 371/431 |
| 5,883,894 | 3/1999 | Patel et al. | 370/438 |
| 5,889,776 | 3/1999 | Liang | 370/389 |
| 5,892,926 | 4/1999 | Witkowski et al. | 395/280 |
| 5,907,553 | 5/1999 | Kelly et al. | 370/433 |
| 5,922,052 | 7/1999 | Heaton | 709/223 |
| 5,923,663 | 7/1999 | Bontemps et al. | 370/445 |
| 5,949,788 | 9/1999 | Friedman et al. | 370/431 |

FOREIGN PATENT DOCUMENTS

| | | |
|---|---|---|
| 0540452 A1 | 10/1992 | European Pat. Off. . |
| 0596736 A1 | 5/1996 | European Pat. Off. . |
| 0714191 A2 | 5/1996 | European Pat. Off. . |
| WO93/03568 | 2/1993 | WIPO . |
| WO96/07132 | 3/1996 | WIPO . |

*Primary Examiner*—Chau Nguyen
*Assistant Examiner*—Forood Boortalary

[57] ABSTRACT

A Gigabit network node having a media access controller outputting packet data at Gigabit rates uses multiple 100 MB/s media interface links coupled to a physical interface to enable implementation of a Gigabit network using low cost data links. A modified reconciliation layer, also referred to as a media interface, receives a data packet from a Gigabit MAC and divides the received data packet into multiple data segments having a prescribed length. The multiple segments are output on the multiple media interface links according to a prescribed output protocol, enabling a corresponding media interface at the destination station to recompile the data packet from the received segments from the multiple transmission paths. The transmission of the segments upon multiple transmission paths provides an efficient load balancing of data traffic among the multiple transmission paths.

28 Claims, 3 Drawing Sheets

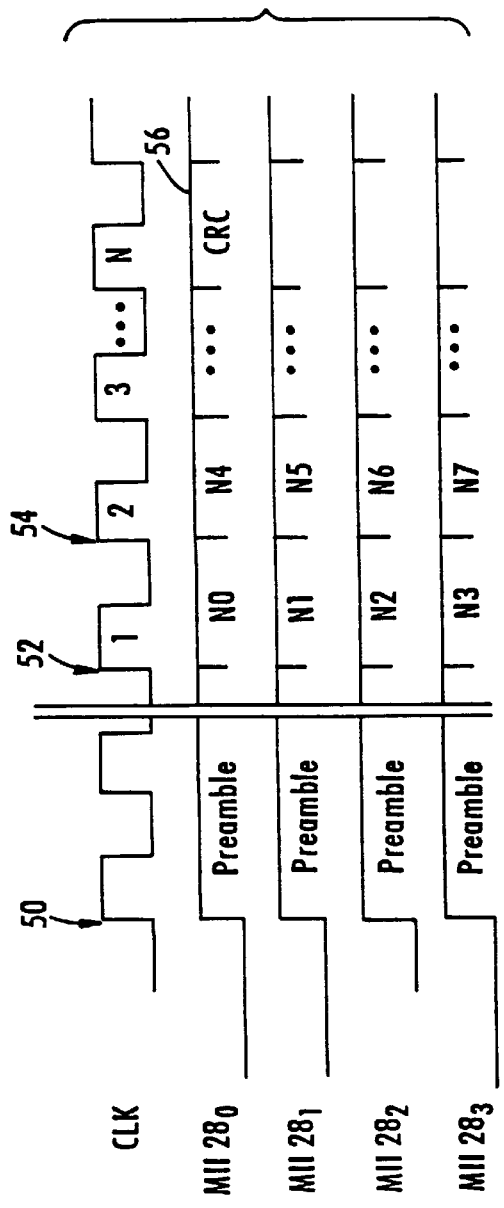
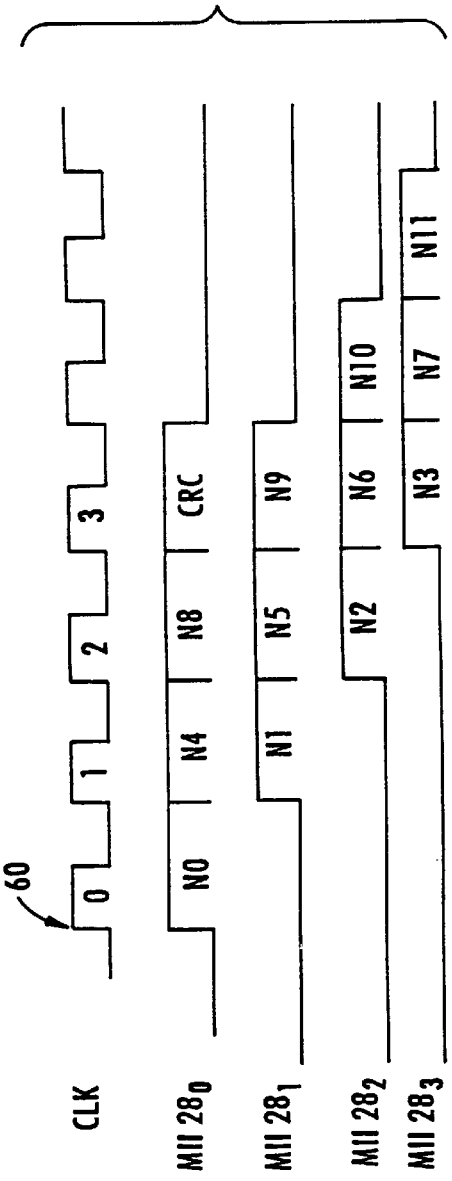

ARRANGEMENT FOR TRANSMITTING PACKET DATA SEGMENTS FROM A MEDIA ACCESS CONTROLLER ACROSS MULTIPLE PHYSICAL LINKS

BACKGROUND OF THE INVENTION

1. Technical Field

The present invention relates to transmitting packet data on a high speed network, more specifically to methods and systems for transmitting data from a media access controller (MAC) layer onto a physical layer of a full-duplex network operating at data rates of at least one Gigabit per second.

2. Background Art

Local area networks use a network cable or other media to link stations on the network. Each local area network architecture uses a media access control (MAC) that sends data packets to a physical layer transceiver for transmission on the network media.

The Ethernet protocol ISO/IEC 8802-3 (ANSI/IEEE standard 802.3, 1993 edition) defines a half-duplex media access mechanism that permits all stations to access the network channel with equality. The half-duplex mechanism typically operates at either 10 MB/s, or 100 MB/s. A full-duplex environment has also been proposed for Ethernet networks, referred to as IEEE 802.3x, Full-Duplex with Flow Control—Working Draft (0.3). The full-duplex environment provides a two-way, point-to-point communication link between two networks stations using the switched hub, for example at 100 MB/s, so that two stations can simultaneously transmit and receive Ethernet data packets between each other without collision.

The IEEE 802.3z Task Force is currently defining standards for the operation of a shared (i.e., half-duplex) and full-duplex Gigabit Ethernet. The standard will describe a media access control (MAC) layer, a reconciliation layer, a Gigabit-media independent interface (GMII), and physical media dependent sublayers that will implement the physical layer (PHY) of the proposed networks. The proposed networks will enable users to implement Ethernet links capable of operating at a data rate of 1 Gigabit per second in half-duplex mode and 2 Gigabits per second in full-duplex mode.

Currently, the Fast Ethernet standard describes a media independent interface (MII) that is used to connect Fast Ethernet MAC layer devices to the Fast Ethernet devices, enabling users to implement Ethernet links operating at 100 MB/s half-duplex, and 200 MB/s full-duplex.

There currently is no means for users to implement Ethernet links that operate in the range of data rates that exceed 200 MB/s and are lower than 1 Gigabit per second. In addition, efforts at implementing a physical data link at Gigabit transmission rates is very expensive, since the current state of technology does not permit use of copper links for Gigabit data rate transmissions. Hence, only fiber optics can be used to transmit data at Gigabit data rates.

One arrangement for implementing physical layer data links that provide Gigabit transmission rates is disclosed in commonly assigned, co-pending application Ser. No. 08/912,235, filed Aug. 15, 1997, entitled "ARRANGEMENT FOR TRANSMITTING HIGH SPEED PACKET DATA FROM A MEDIA ACCESS CONTROLLER ACROSS MULTIPLE PHYSICAL LINKS" (attorney docket 1033-292). The disclosed arrangement uses a modified reconciliation layer between the media access controller and the physical layer to transmit at least a portion of the packet data from the media access controller onto multiple media interface links. Use of multiple media interface links provides higher data transmission rates in a cost effective manner by simultaneously transmitting different serial data streams on multiple media interface links, effectively increasing the data rate.

SUMMARY OF THE INVENTION

There is a need for an arrangement that specifically identifies implementation functions necessary to enable load balancing of high speed packet data across multiple physical links.

There is also a need for an arrangement that specifies an architecture necessary to implement load balancing of high speed packet data across multiple media interface links.

These and other needs are attained by the present invention, where received packet data from a high speed media access controller is transmitted across multiple layer links as segments, where each segment is output to a corresponding physical layer link according to a prescribed output protocol.

According to one aspect of the present invention, a method of transferring packet data output from a media access controller of an originating network node to a destination network node comprises establishing a plurality of first media interface links each configured for transmitting data at a first data rate to the respective media interface links in communication with the destination network node, receiving the packet data from the media access controller by a media interface via a second media interface link at a second data rate higher than the first data rate, and transmitting segments of the received packet data from the media interface for transmission on the first media interface links by transmitting each of the segments to a corresponding one of the first media interface links according to the first data rate and a prescribed output protocol. Transmission of segments of packet data received from a media access controller onto media interface links at a lower data rate enables load balancing among the multiple media interface links, enabling transmission of packet data from a high speed media access controller in an economic manner by evenly distributing segments of the packet data along multiple lower-rate transmission paths.

Another aspect of the present invention provides an apparatus for transmitting packet data received from a media access controller at a first transmission rate, comprising a preamble detector configured for detecting a preamble from the media access controller indicating a start of the packet data, a transmit buffer configured for storing the received packet data, and a media interface controller configured for outputting segments of the packet data stored in the transmit buffer to multiple media interface links at a second transmission rate less than the first transmission rate and according to a prescribed output protocol. The media interface controller enables transmission of high speed data along multiple lower-speed media interface links according to a prescribed output protocol, enabling a receiver to recompile the original high speed data packet from the transmitted segments received from multiple transmission paths. The preamble generators also ensure that the receiver is capable of synchronizing to each of the media interface links for reliable reception of each of the data segments, without the necessity of error checking on the individual links.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 3A and 3B timing diagrams illustrating alternative output protocols for transmitting segments of packet data on respective media interface links.

BEST MODE FOR CARRYING OUT THE INVENTION

The disclosed embodiment enables a media implementation of Gigabit networks using multiple 100 MB/s PHY technology. Since 100 MB/s PHY technology is readily available and cost effective, the 100 MB/s links provide an inexpensive and transparent solution for applications needing higher bandwidth and quality of service options. Moreover, the scaleable link is transparent to the user's application, system and device drivers, enabling a user to seamlessly migrate to full Gigabit speeds by simply replacing the disclosed media interface and corresponding physical layer with a Gigabit compliant implementation, once available in the technology.

The disclosed arrangements are directed to implementation of an Ethernet link having scaleable speeds from 200 MB/s to Gigabit rates in 200 MB/s steps, using existing 100 MB/s physical layer (PHY) technology. The disclosed embodiment receives packet data from a Gigabit MAC, divides the packet data into segments, and selectively outputs the segments of the packet data to multiple physical layer devices operating at 100 MB/s. Use of multiple links enables parallel transmissions of different segments to increase the effective data rate, for example using ten (10) 100 MB/s physical links to produce one virtual GB/s link.

Figure 1:
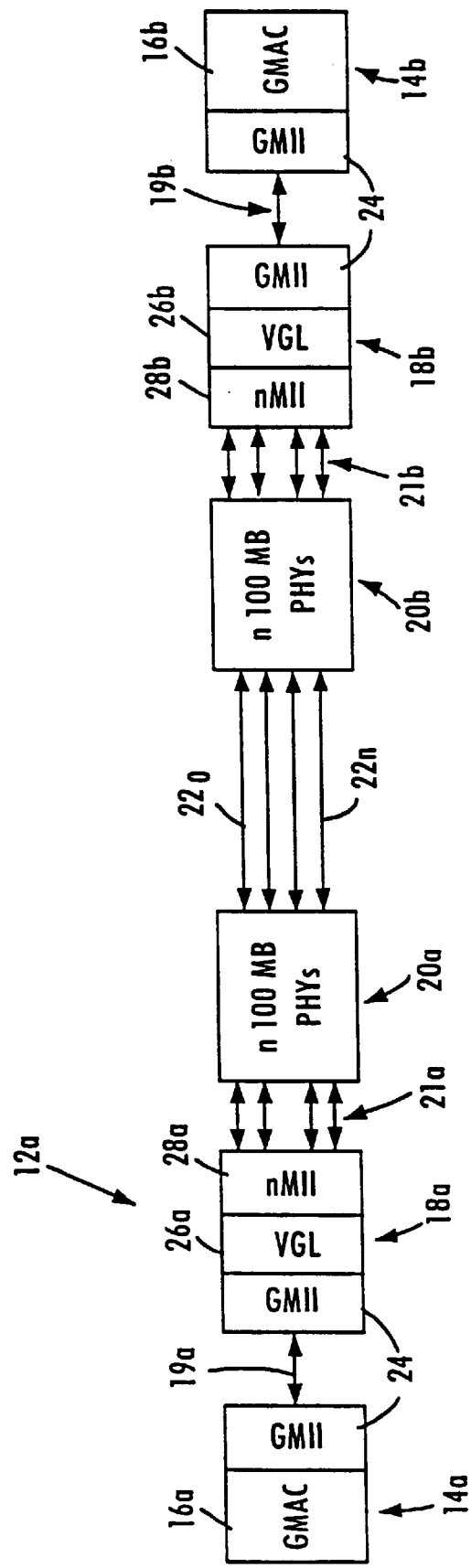
FIG. 1 is a block diagram illustrating an arrangement for transmitting packet data across a high speed data network according to an embodiment of the present invention.

FIG. 1 is a block diagram illustrating the use of multiple layer links in order to provide Gigabit transmission rates using 100 MB/s data links according to an embodiment of the present invention. Each network node 12 includes a protocol layer and a device driver (not shown), and a Gigabit media access controller (GMAC) layer 14 having a Gigabit MAC (GMAC) core 16 compliant with the Gigabit Ethernet standards proposed by the IEEE 802.3z Working Group. Each network node 12 also includes a special reconciliation layer 18, also referred to as a generic media interface, which interfaces with media interface link 19 to the Gigabit MAC 18 and provides service functions required to distribute, multiplex, demultiplex, and aggregate traffic via a plurality of 100 MB/s media interface links 21 to and from at least one 100 MB/s physical layer (PHY) device 20 providing a plurality of 100 MB/s media interface links $22_0$, $22_1$, $22_2$, to $22_n$. As shown in FIG. 1, the special reconciliation layer 18 and the GMAC layer 14 include Gigabit speed media independent interfaces (GMII) 24 for sending and receiving IEEE 802.3z compliant data packets, for example on a per-byte basis at 125 MB/s via the media interface link 19.

The GMAC 16 generates a data packet, also referred to as a data frame, according to IEEE 802.3 protocol. The GMAC 16 then outputs the data packet including preamble, header (including source and destination addresses, optional VLAN tag, packet type/length), payload data, and cyclic redundancy check (CRC) fields to the reconciliation layer 18 (i.e., the media interface) via the GMII interface 24. The reconciliation layer 18 includes a virtual Gigabit layer 26 configured for receiving the data packet from the GMII interface 24 at the Gigabit data rate, and configured for transmitting segments of the received packet data for transmission on the media interface links $22_0$–$22_n$ by transmitting each segment to a corresponding one of the media interface links 22. Specifically, the virtual Gigabit layer divides the received packet data from the GMII interface 24, and outputs each segment to one of a plurality of media independent interfaces (MII), shown collectively in FIG. 1 as nMII 28. As recognized in the art, each of the MIIs 28 provides a 100 MB/s full duplex connection via a corresponding media interface link 21 to the physical layer device 20 for transmission and reception across a corresponding physical layer link 22. The physical layer devices 20 may be of type 100BASE-TX, 100BASE-T4, or 100BASE-FX, as desired.

As described in detail below, the virtual Gigabit layer (VGL) 26 enables data packets received from the GMAC 16 at Gigabit rates across the GMII 24 to be transferred across 100 MB/s media interface links 22 by dividing the received data packet into segments each having a prescribed length, and outputting each data segment onto a selected MII 28 coupled to the corresponding media interface link 21 for transmission on a corresponding one of the 100 MB/s media interface links 22. As described in detail below, the VGL 26 provides the appropriate signaling to ensure that the destination reconciliation layer 18b, also referred to as the destination media interface, is able to synchronize to each of the media interface links 22 and recompile the received segments in the appropriate sequence to output a valid Gigabit data frame to the GMAC 16b.

Figure 2:
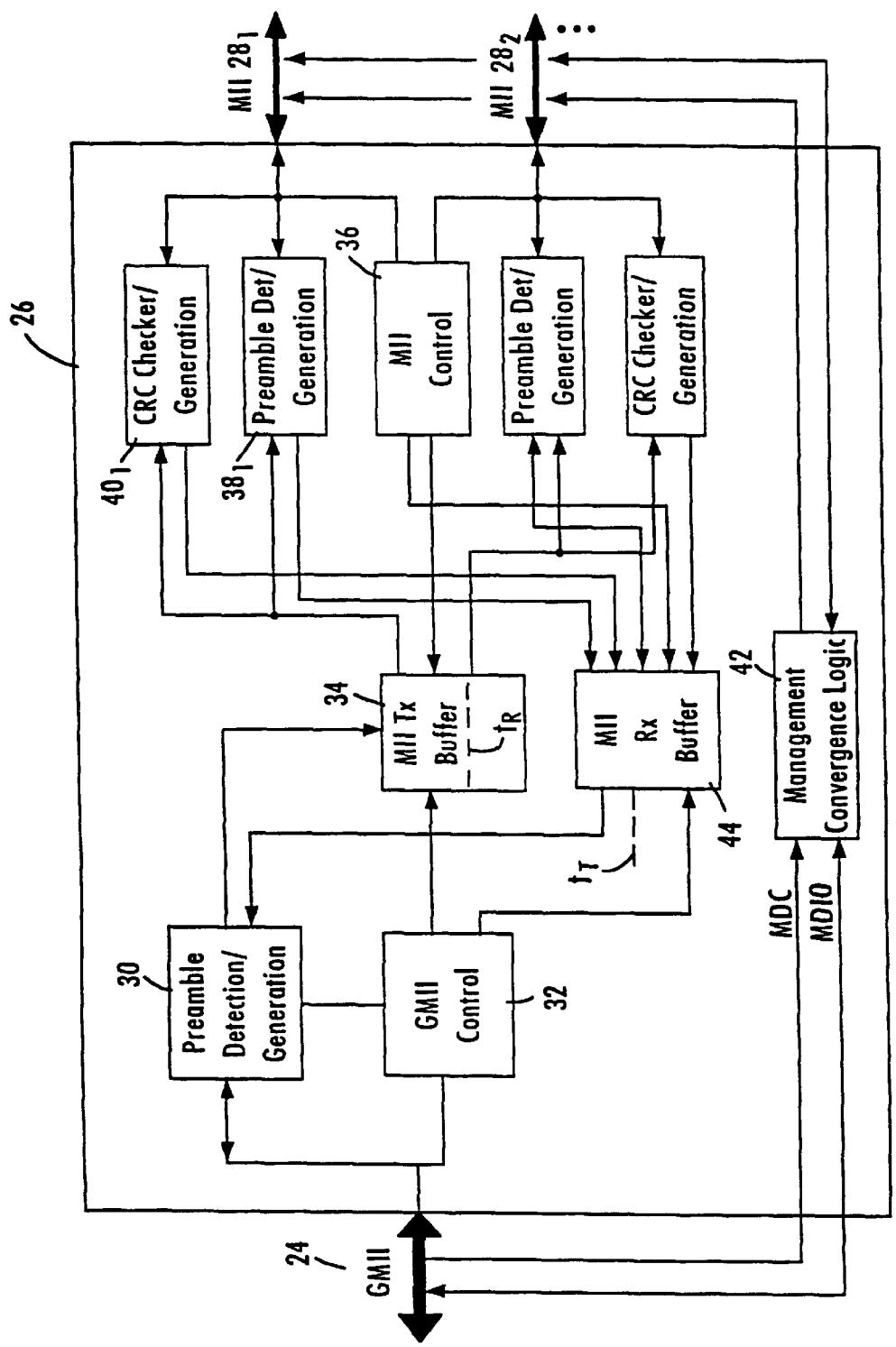
FIG. 2 is a block diagram illustrating in detail the virtual Gigabit layer for transferring data from a media access controller to multiple media interface links according to an embodiment of the present invention.

FIG. 2 is a block diagram illustrating in detail one of the virtual Gigabit layers 26a of FIG. 1 according to an embodiment of the present invention. As shown in FIG. 2, the VGL 26a includes a preamble detection and generation circuit 30 configured for detecting a preamble from the GMAC 16a via the GMII 24 indicating a start of packet data at a Gigabit data rate, and generating a preamble at a Gigabit data rate for a data packet received from the media interface links 21a for transmission to the GMAC 16a. The VGL 26a also includes a GMII control circuit 32, an MII transmit buffer 34, an MII control 36, a plurality of 100 MB/s preamble detection and generation circuits 38, a plurality of cyclic redundancy check (CRC) checkers/generation circuits 40 and management convergence logic 42 configured for supplying a management data clock (MDC) and management data (MDIO) between the GMII 24 and the multiple 100 MB/s MII links 28. The VGL 26 also includes an MII receive buffer 44 for data received from the MIIs 28 to be output to the GMII 24.

As shown in FIG. 2, transmit packet data output by the GMAC 16a is received by the VGL 26a via the GMII 24 across the Gigabit media interface link 19a. The preamble detection/generation circuit 30 detects a preamble on the Gigabit packet on the GMII interface 24, enabling the VGL 26a to synchronize with the GMAC 16a and to begin reception of the packet data following the preamble. In response to detection of the preamble, the GMII control 32 strips off the preamble and forwards the packet data (including preamble, header, payload data, and CRC field) to the MII transmit buffer 34. The transmit buffer 34 and the receive buffer 44 are preferably implemented as SRAM devices responsive to address control logic within the GMII control 32 and the Mul control 36. Specifically, the GMII control 32 includes address control logic that writes the Gigabit packet data into the transmit buffer 34 according to a first in first out (FIFO) storage sequence.

The MII control 36 has separate addressing control logic enabling random access to the stored data in the transmit buffer 34. Specifically, the MII control 36 outputs a first portion of the packet data based on the start address storing the first nibble (i.e., four bits) of packet data. As described in detail below, the MII control 36 selectively accesses the transmit buffer 34 to obtain a segment of the packet data stored in the transmit buffer 34. According to the disclosed embodiment, a segment is at least four bits of contiguous data (i.e., a nibble), although larger segment sizes may be used. The MII control 36 obtains the identified segment and outputs the segment to a selected one of the MIIs $28_i$, described in detail below. Hence, the MII controller 36 controls transmission of the segments of the received packet data stored in the transmit buffer 34 for transmission on the 100 MB/s media interface 21a by transmitting each segment to a corresponding MII $28_i$ for transmission on the corresponding media interface link $21a_i$ and the corresponding physical layer link $22_i$.

In addition, the MII control 36 controls initiation and generation of preambles on each of the MIIs $28_i$, enabling the destination VGL 26b to synchronize with the media interface links 22 and the corresponding 100 MB/s media interface links 21b, as well as to recompile the received segments into a data packet. Specifically, the MII control 36 causes each of the preamble detection/generation circuits $38_i$ to generate a preamble and start frame delimiter preceding the output of the first segment onto the corresponding MII $28_i$.

An additional optional feature is generation of a 100 MB/s CRC field for a plurality of data segments transmitted along a selected one of the MII links 28 and the corresponding physical layer link 22. For example, the MII $28_0$ of FIGS. 3A and 3B may be appended with a CRC field generated based upon the continuous stream of nibbles N0, N4, and N8 in order to determine the link status and/or link integrity. A complementary CRC checker 40 at the receiving (destination) VGL 26b could then decode the generated CRC field to determine whether the corresponding media interface link $21b_i$ and physical layer link $22_i$ provide a reliable connection.

The MII control 36 also controls restoring the received segments in the MII receive buffer 44 in the appropriate contiguous sequence by using the addressing control logic to write the received segment into the appropriate memory location relative to the other received segments, enabling the original data packet transmitted by the GMAC 16 to be recompiled as a Gigabit packet. Once the Gigabit packet is recompiled and at least a predetermined minimum number of bytes are stored in the receive buffer 44 (e.g., relative to a threshold $t_R$), the GMII controller 32 causes the preamble detection/generation circuit 30 to output a preamble on the GMII interface 24 to the corresponding GMAC 16a, followed by transmission of the recompiled data packet from the receive buffer 34 to the GMAC 16 via the GMII 24.

FIGS. 3A and 3B are timing diagrams illustrating alternative output protocols used by the MII control 36 to transmit data packet segments to the media interface links 21 via the respective MIIs 28 for transmission on the respective media interface links 22. FIG. 3A illustrates an output protocol where the media interface controller 36 simultaneously transmits a first contiguous group of segments to the respective MIIs (and subsequently the respective media interface links) according to a predetermined link order. Specifically, the MII control 36, upon detecting a minimum number of bytes in the transmit buffer 34, generates a control signal causing the preamble detection/generation circuits 38 to generate a preamble signal on the respective MIIs simultaneously and synchronously with respect to a 25 MHz clock signal at event 50. As recognized in the art, each preamble generation circuit 38 generates seven bytes of preamble followed by one byte of start frame delimiter on the corresponding MII $28_i$, followed by data.

Following transmission of the first eight bytes of preamble and start frame delimiter, the MII control 36 outputs a first contiguous group of segments to the respective MIIs 28 (and subsequently the respective media interface links 22) simultaneously during clock cycle "1" at event 52. For example, the MII control simultaneously outputs the contiguous segments N0, N1, N2, and N3 on MIIs $28_0$, $28_1$, $28_2$, and $28_3$, respectively. According to the arrangement of FIG. 3A, the MII control 36 of VGL 26a and the corresponding MII control 36 of VGL 26b operate according to the prescribed output protocol that the first segment of packet data is output on an identified first MII $28_0$, and that subsequent contiguous packets (e.g., N1, N2, and N3) will be simultaneously supplied on subsequent MIIs (e.g., $28_1$, $28_2$, and $28_3$) according to a predetermined link order MII $28_0$, MII $28_1$, MII $28_2$, MII $28_3$, etc. Hence, the output protocol of FIG. 3A enables a destination VGL 26 to synchronize to each of the media interface links 22 and the corresponding MIIs 28 upon detection of the preamble. Moreover, the protocol of FIG. 3A establishes a predetermined condition, where the receiving MII controller 36 will know that the appropriate sequence of segments (N0, N1, N2, N3, etc.) will be transmitted by MII interfaces $28_0$, $28_1$, $28_2$, $28_3$, and via physical layer links $22_0$, $22_1$, $22_2$, and $22_3$, respectively.

Following transmission of the first contiguous group of segments, the MII control 36 on the transmitting end then controls simultaneous transmission of a second contiguous group of the segments (e.g., N4, N5, N6, and N7) at the next clock cycle "2" at event 54. Hence, the MII control 36 of the receiving station is able to receive each segment and store each segment in the appropriate contiguous sequence of segments in order to recompile the data packet for transmission at the Gigabit MAC layer.

As shown in FIG. 3A, the MII $28_0$ outputs a data stream starting with the preamble, followed by a plurality of the data segments (e.g., N0, N4, etc.), followed by a CRC field generated by the corresponding CRC checker generation circuit $40_0$ based on the segments output on the MII link $28_0$ following the corresponding preamble. Hence, the CRC field 56, separate from the CRC field used by the GMAC 16 at the Gigabit MAC layer, enables the VGL 26 to monitor performance of a selected one of the links 22 and 28.

FIG. 3B is a timing diagram illustrating an alternate output protocol, where the MII control 36 outputs each successive segment of a first contiguous group of segments onto a corresponding physical layer link at predetermined intervals following the previous segment. For example, the MII control 36 outputs the first segment (N0) at event 60, corresponding to a rising edge of the 25 MHz MII clock. Although not shown, it is assumed that each of the MII interfaces shown in FIG. 3B has a preamble and start frame delimiter generated immediately prior to the corresponding first data segments. The next segment (N1) is output one clock cycle later at event 62 by the MII control 36 onto the MII $28_1$. At the same time, the MII control 36 outputs the first segment from a second contiguous group (N4) onto MII $28_0$.

Hence, the MII control 36 provides a delay offset output protocol, such that each segment of the first contiguous group (N0, N1, N2, and N3) is successively output to a corresponding MIII following a predetermined delay, preferably of one clock cycle. Hence, segments N0, N1, N2, and N3 will be output by the MII controller onto MIIs $28_0$, $28_1$, $28_2$, and $28_3$ at clock cycles 0, 1, 2, and 3, respectively. This arrangement of FIG. 3B provides the advantage that the destination station can independently determine which MII 28 (and subsequently which physical layer link 22) transmits the first segment based on the delay offset on each link, although additional buffering capacity is necessary to map the received segments into the appropriate sequence. Hence, the arrangement of FIG. 3B enables the media interfaces 18a and 18b to adapt automatically to a link failure.

According to the disclosed embodiment, transmissions of segments of packet data from a Gigabit media interface link onto multiple 100 MB/s media interface links enables transmission of packet data from a high speed media access controller in an economic manner by evenly distributing segments of the packet data along multiple lower-rate transmission paths. Moreover, the use of segments enables the traffic load among the multiple transmission paths to be evenly balanced. In addition, use of prescribed output protocols between the source and destination media interfaces enables the segments at the destination station to be recompiled to recover the original data packet.

Although the disclosed embodiment has been described using a GMII-compliant PHY interface, IEEE 802.3z specifies that the GMAC may be connected to either the GMII-compliant PHY or an 8B/10B-compliant PHY, where 8B/10B encoding is done in the MAC. The disclosed VGL 26 may be modified for 8B/10B protocol by performing 8B/10B decoding of encoded transmit data from the GMAC 16 prior to storage in the Tx buffer 34, performing 8B/10B encoding of receive data prior to output from the RX buffer 44 to the GMAC 16, and substituting the GMII interfaces 24 with the appropriate 8B/10B interfaces. Hence, the present invention encompasses the use of the alternative 8B/10B protocol.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method of transferring packet data output from a media access controller of an originating network node to a destination network node, comprising:
    establishing a plurality of first media interface links, each connected to a physical layer device which is connected to a respective physical layer link, the respective physical layer links being in communication with the destination node, each first media interface link configured for transmitting data at a first data rate to the respective physical layer link;
    receiving the packet data from the media access controller by a media interface via a second media interface link at a second data rate higher than the first data rate;
    dividing the received packet data into segments each having a prescribed length; and
    transmitting each segment of prescribed length of the received packet data onto a corresponding one of the first media interface links according to the first data rate and a prescribed output protocol.

2. The method of claim 1, wherein the dividing and transmitting steps comprise:
    detecting a preamble preceding the received packet data from the media access controller;
    storing the received packet data following the preamble in a transmit buffer; and
    outputting each of the segments from the transmit buffer to a selected one of the media interface links based on the prescribed output protocol.

3. The method of claim 2, wherein the outputting step comprises reading a prescribed number of bits from the transmit buffer for said each segment.

4. The method of claim 1, wherein the dividing and transmitting steps comprise outputting a preamble to each of the media interface links before transmission of the corresponding segments.

5. The method of claim 4, wherein the dividing and transmitting steps further comprise generating and outputting error correction fields for the transmitted segments on at least one of the media interface links.

6. The method of claim 4, wherein the dividing and transmitting steps comprise outputting said each segment to the corresponding one media interface link based upon a corresponding position within the received packet data.

7. The method of claim 6, wherein the outputting step comprises:
    first outputting a first of the segments to one of the media interface links; and
    second outputting a second of the segments, contiguous with and following the first of the segments, to a second of the media interface links a predetermined interval after the outputting of the first of the segments.

8. The method of claim 7, wherein the prescribed output protocol specifies the transmission of the segments in successive sequence on the respective media interface links offset by said predetermined interval.

9. The method of claim 7, wherein the predetermined interval corresponds to a physical layer link clock cycle.

10. The method of claim 6, wherein the outputting step comprises:
    first simultaneously outputting a first contiguous group of the segments to the respective media interface links according to the prescribed protocol; and
    second simultaneously outputting a second contiguous group of the segments following the first contiguous group, to the respective media interface links according to the prescribed protocol.

11. The method of claim 4, further comprising:
    at a destination media interface in the destination network node:
    synchronizing to the physical layer links based on detection of the preambles having been transmitted across the respective physical layer links;
    receiving the segments from the respective physical interface links at the first data rate; and
    restoring the received packet data from the received segments based on the prescribed output protocol.

12. The method of claim 11, wherein the restoring step comprises:
    storing each of the received segments in a receive buffer based on a corresponding position in a reception sequence; and outputting the data stored in the receive buffer as a contiguous sequence to a destination media access controller in the destination network node and at the second data rate.

13. The method of claim 12, wherein the restoring step further comprises generating and outputting a preamble preceding before the outputting of the data stored in the receive buffer to media access controller at the destination node.

14. The method of claim 11, wherein:

the dividing and transmitting steps further comprise generating and outputting an error correction field for one of the transmitted segments to a corresponding one of the media interface links;

the method further comprising detecting the error correction field at the destination media interface, and determining a link status at the destination media interface for the corresponding physical layer link based on the detection of the error correction field.

15. The method of claim 1, wherein the dividing and transmitting steps comprise:

first outputting a first contiguous group of the segments to the respective media interface links according to the prescribed protocol; and second outputting a second contiguous group of the segments, following the first contiguous group, to the respective media interface links according to the prescribed protocol and as a continuous data stream.

16. The method of claim 1, wherein the first and second outputting steps each comprise outputting the corresponding contiguous group of segments simultaneously.

17. The method of claim 15, wherein the first and second outputting steps each comprise outputting the corresponding contiguous group of segments based on a corresponding delay offset for each of the physical layer links.

18. An apparatus for transmitting packet data, received from a media access controller at a first transmission rate, to respective media interface links connected to a physical layer device which is connected to a respective physical layer link, comprising:

a preamble detector configured for detecting a preamble from the media access controller indicating a start of the packet data;

a transmit buffer configured for storing the packet data received from the media access controller; and a media interface controller configured for outputting segments of a prescribed length of the packet data stored in the transmit buffer to said respective media interface links connected to said physical layer device connected to the respective physical layer link, the respective physical layer links being in communication with the destination node, said segments being output to said respective media interface links at a second transmission rate less than the first transmission rate and according to a prescribed output protocol.

19. The apparatus of claim 18, further comprising a plurality of preamble generators, responsive to control signals from the media interface controller, configured for outputting preambles to the respective media interface links at the second transmission rate prior to transmission of at least a first group of the segments to the media interface links.

20. The apparatus of claim 19, wherein the media interface controller causes the first group of segments to be output as a first contiguous group of the segments to the media interface links according to said prescribed protocol and a second contiguous group of the segments to be output to the media interface links following the first contiguous group and according to the prescribed protocol.

21. The apparatus of claim 20, wherein the media interface controller causes transmission of each successive segment of the first contiguous group to the corresponding media interface link a predetermined delay interval following the previous segment.

22. The apparatus of claim 20, wherein the media interface controller simultaneously transmits the first contiguous group of the segments to the respective media interface links according to a predetermined link order.

23. The apparatus of claim 18, further comprising an error generator for outputting an error check code for at least a selected one of the segments on a corresponding media interface link.

24. The apparatus of claim 23, wherein the error generator generates the error check code for a plurality of the segments output to a selected one of the media interface links that follow the corresponding preamble.

25. The apparatus of claim 18, wherein:

the preamble generators each comprise preamble detection circuitry for detecting a received preamble from the corresponding media interface link, the apparatus further comprises a receive buffer for storing received segments from the media interface links in an order specified by the media interface controller; and a media access control interface controller for supplying the stored segments from the receive buffer as a recompiled data packet to the media access controller.

26. The apparatus of claim 25, wherein the media interface controller determines said order based on a detected delay offset between the media interface links.

27. The apparatus of claim 25, wherein the media interface controller determines said order based on a prescribed order of the media interface links.

28. The apparatus of claim 25, wherein the preamble detector includes preamble generation circuitry for outputting a second preamble preceding the recompiled data packet to the media access controller.

* * * * *